O. W. MOTT.
DEMOUNTABLE RIM OF THE CROSS-CUT TYPE.
APPLICATION FILED FEB. 8, 1917.
1,338,390.
Patented Apr. 27, 1920.
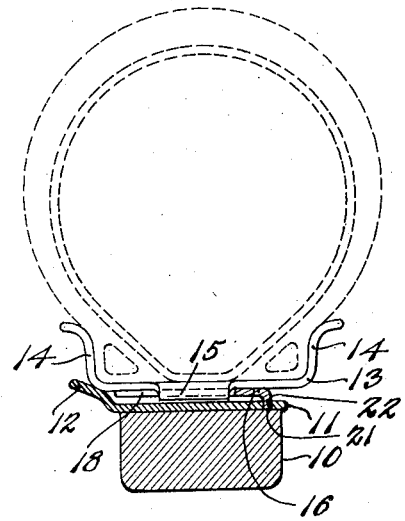
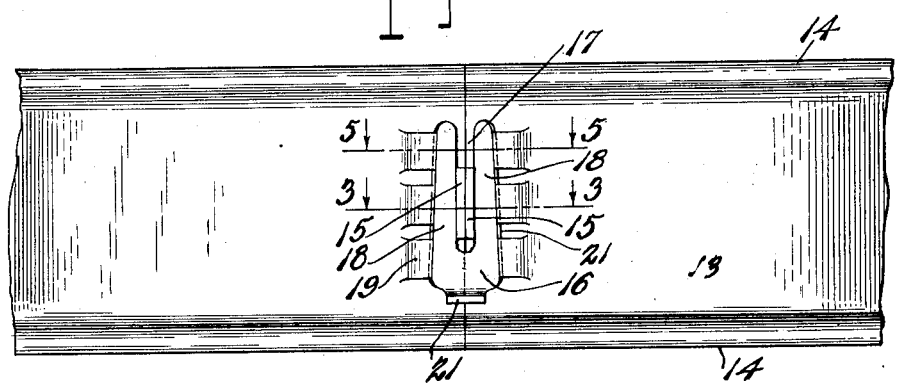
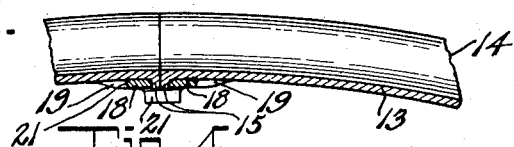
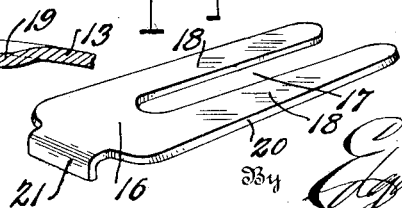
Inventor
Otis W. Mott
By
His Attorney.

UNITED STATES PATENT OFFICE.

OTIS W. MOTT, OF JACKSON, MICHIGAN, ASSIGNOR TO PERLMAN RIM CORPORATION, OF NEW YORK, N. Y., A CORPORATION OF NEW YORK.

DEMOUNTABLE RIM OF THE CROSS-CUT TYPE.

1,338,390.　　　　　Specification of Letters Patent.　　Patented Apr. 27, 1920.

Application filed February 8, 1917. Serial No. 147,402.

*To all whom it may concern:*

Be it known that I, OTIS W. MOTT, a citizen of the United States, residing at Jackson, in the county of Jackson and State of Michigan, have invented certain new and useful Improvements in Demountable Rims of the Cross-Cut Type; and I do hereby declare the following to be a full, clear, and exact description of the invention, such as will enable others skilled in the art to which it appertains to make and use the same.

The present invention has reference to demountable rims of the cross-cut type, and has particular reference to means for securing the ends of the rim together.

An object is to provide means for a cross-cut demountable rim for securing the ends of the latter together, such means being formed and constructed to engage the wheel body when the rim is in place and retain the means from accidental dislodgment from the ends of the rim.

Another object of this invention is to provide a cross-cut demountable rim with a locking key for engagement with the ends of the rim to hold the same firmly together; which may be applied and removed by a transverse movement of the key relatively to the rim; and which is provided with means for interlocking the key to the wheel body when the rim is in place on the latter.

A further object of the present invention is to peculiarly form the meeting ends of a cross-cut rim, and to provide a key of peculiar form for engagement with said ends of the rim for interlocking the rim ends and the key to hold the latter in place and to brace the key against deformation when placed under tension.

The above, and various other objects and advantages of this invention will be in part described, and in part understood, from the following detailed description of the present preferred embodiment, the same being illustrated in the accompanying drawing wherein:

Figure 1 is a transverse section taken through the peripheral portion of a wheel body, showing a demountable rim mounted thereon and having end securing means constructed according to this invention applied thereto, the dotted lines showing a pneumatic tire of the straight bead type applied to the rim.

Fig. 2 is a fragmentary plan view of a cross-cut demountable rim, showing the inner face thereof, and the locking key of this invention applied to the meeting ends of the rim.

Fig. 3 is a fragmentary, circumferential section taken on the line 3—3 of Fig. 2 through the meeting ends of the rim and the locking means applied thereto.

Fig. 4 is a detail perspective view, enlarged, of a locking key forming part of the means of this invention.

Fig. 5 is an enlarged, fragmentary section taken on the line 5—5 of Fig. 2, showing the dovetail engagement of the locking key with the meeting ends of the rim.

Referring to the drawing, 10 designates the felly, and 11 the felly band or fixed rim of a wheel body, the felly band 11 having at one edge thereof a supporting stop flange 12.

A demountable rim 13 of the cross-cut type is adapted to be mounted on the felly band 11 in any desired manner, and has tire-engaging flanges 14 of any desired shape, straight flanges being shown in the present instance. The meeting ends of the cross-cut rim 13 are provided, at their abutting edges, with inturned lips or projections 15 adapted to abut in substantially the transverse plane of the cross-cut of the rim. The lips 15 are relatively short, extend across the meeting edges of the rim to a considerable extent, and are adapted to be held in abutting relation by a transversely movable key 16. The key 16 is in the form of a relatively flat plate bifurcated at one end to provide a longitudinally extending slot 17 and spaced apart fingers 18. The extremities of the fingers 18 are preferably rounded to facilitate the application of the key to the lips 15, and the inner opposite edges of the fingers are preferably disposed in substantially parallel relation. The key tapers from end to end, the outer edges of the fingers 18 converging from the closed end of the key to the tips of the fingers.

The meeting ends of the rim 13 are provided, in spaced relation from the lips 15, with one or more bracing lugs 19 which may be stamped from the body of the rim 13, and which are pressed or offset inwardly from the same.

In the present instance, each end of the rim 13 is provided with a transverse row of three lugs 19, and the lugs are spaced at their free ends from the adjacent lips 15 sufficiently to admit the insertion of the fingers 18 of the key between the lips and the lugs. The key 16 is held from dislodgment from the lips 15, and flat against the inner side of the rim, by oppositely inclining abutting edges 20 of the fingers 18 and the lugs 19 to form a dove-tailed engagement between the key 16 and the ends of the rim.

The outer, or larger, end of the key 16 is provided with an inwardly extending tongue or projection 21 which, when the key is in position extends away from the inner face of the rim 13. This tongue 21 is adapted to project into a recess or depression 22 formed in the peripheral surface of the felly band 11 adjacent to the outer edge thereof, or near the edge remote from the stop flange 12.

In use, the meeting ends of the cross-cut rim 13 are secured together by inserting the key 16 between the rows of lugs 19 with the slot 17 in register with the lips 15. The lips 15 are received in the slots 17 of the key and are engaged and firmly held together by the arms 18. By virtue of the dovetailed edges 20, the key 16 is held flat against the inner side of the rim 13 and in engagement with the lips 15. The lugs 19 which engage the arms 18 of the key, hold the arms from spreading and releasing the lips when the rim 13 is subjected to an expanding pressure.

When the rim 13 with the locking key 16 applied thereto is mounted on the wheel body, the tongue 21 is brought into registry with the socket 22 in the felly band 11. When the usual retaining means is applied to the rim 13 for holding it in position, the tongue 21 is forced and held in the socket 22 and the lateral displacemet of the key 16 is prevented.

It is, of course, understood that the present invention embraces all such changes and modifications of the above specifically described embodiment as are within the scope of the following claims.

What I claim is:—

1. The combination of a cross-cut demountable rim having interned lips on its ends and inwardly extending lugs spaced from the lips, and a bifurcated key fitting over the lips to hold the same together and engaging said lugs to hold the key from spreading, said lugs having inwardly converging edges and said key having outwardly converging edges whereby said lugs are adapted to hold the key against the inner face of the rim.

2. The combination of a cross-cut demountable rim and a bifurcated key with the fingers of the key engaging opposite end portions of the rim, each of such rim end portions being formed to engage both edges of the respective finger for preventing leverage stresses at the point of union of the fingers.

In testimony whereof I affix my signature in presence of two witnesses.

OTIS W. MOTT.

Witnesses:
  I. B. LEIBSON,
  EDGAR M. KITCHIN.